A. P. & MARIA. MERCHANT.
Boring-Machines.
No. 5,222. Reissued Jan. 7, 1873.
Fig. 1.
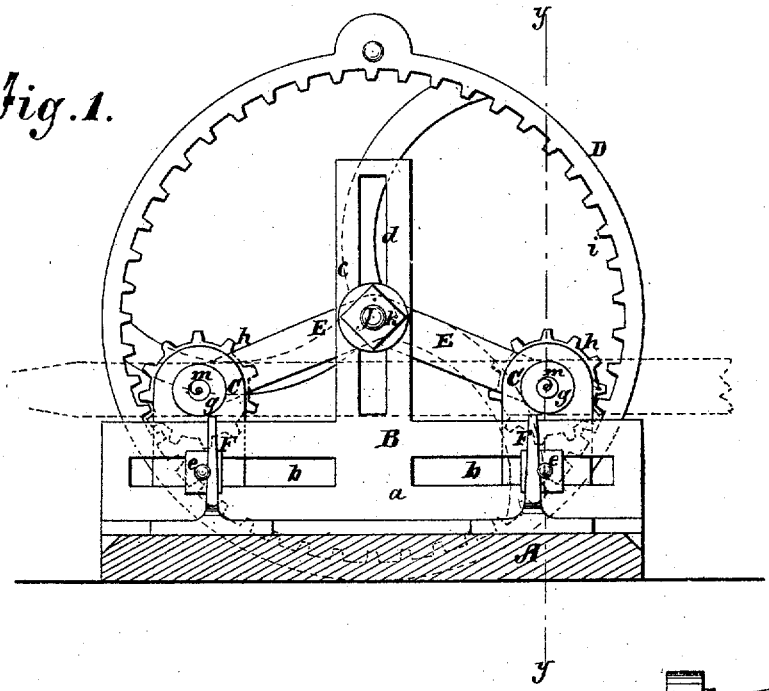
Fig. 3.
Fig. 2.
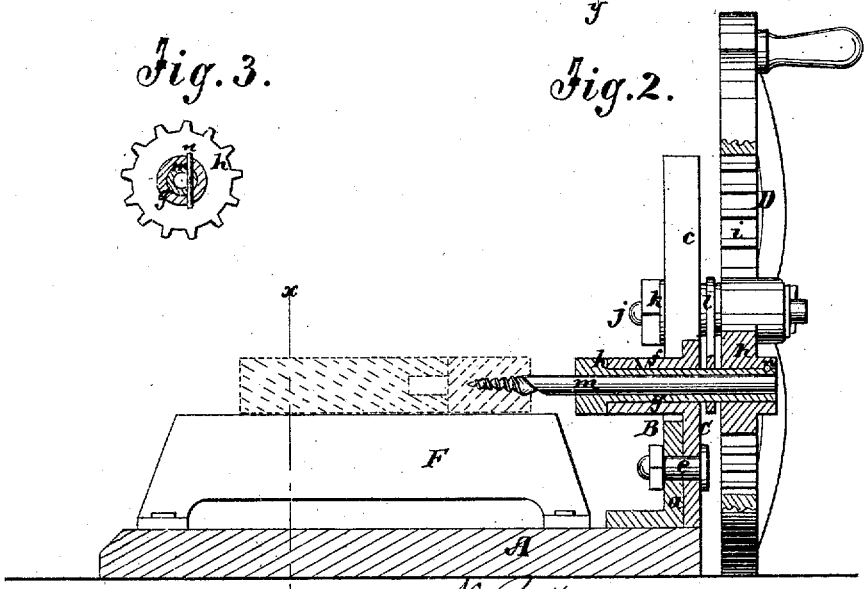
Witnesses:
Alex F. Roberts
Frank N. Blockley
N. R. Merchant
Inventor:
Adm. { A. P. Merchant
Maria Merchant
PER
Attorneys.
A.M. PHOTO-LITHOGRAPHIC CO. N.Y. (OSBORNE'S PROCESS.)

UNITED STATES PATENT OFFICE.

ANDREW P. MERCHANT AND MARIA MERCHANT, ADMINISTRATORS OF N. R. MERCHANT, DECEASED, AND ANDREW P. MERCHANT, ASSIGNEE OF PART INTEREST OF SAID N. R. MERCHANT, OF GUILFORD, NEW YORK.

IMPROVEMENT IN BORING-MACHINES.

Specification forming part of Letters Patent No. 32,449, dated May 23, 1861; reissue No. 5,222, dated January 7, 1873.

*To all whom it may concern:*

Be it known that NIRAM R. MERCHANT, deceased, of Guilford, in the county of Chenango and State of New York, did invent a new and useful Improvement in Boring-Machines, of which the following is a specification:

Figure 1 is a transverse vertical section of the invention taken in the line *x x*, Fig. 2; Fig. 2, a longitudinal vertical section of ditto taken in the line *y y*, Fig. 1; Fig. 3, a detached transverse section of one of the auger-arbors *z z*, Fig. 2, indicating the plane of section.

Similar letters of reference indicate corresponding parts.

The object of this invention is to obtain a simple and efficient machine for simultaneously boring two holes at different distances apart for dowels, designed chiefly for the use of coopers for boring the pieces of cask-heads which are connected by dowels.

To enable others skilled in the art to fully understand this invention, we will proceed to describe the arrangement of mechanism by which it may be practically put in use.

A represents a bed-plate, at one end of which a frame, B, is permanently secured. This frame may be described as being formed of a horizontal plate, *a*, slotted as shown at *b b*, and having a vertical upright plate, *c*, at its center, which is also slotted, as shown at *d*. (See Fig. 1.) C C are two plates or stands, which are secured to the horizontal plate *a* of the frame B by bolts *e e*, said bolts passing through the slots *b b*, and admitting of the lateral adjustment of the stands C on the plate *a*. At the upper part of each stand C there is a bearing, *f*, which is simply a tubular projection cast with the stand. These bearings *f* each receive a tube or bit stock, *g*, at the front ends of which there is a shoulder, *h*, and these shoulders bear against the front ends of the bearings. (See Fig. 2.) On the back end of each bit-stock *g* there is secured a pinion, *h*, and these pinions gear into a spur-wheel, D, which is toothed at the inner side of its periphery, as shown at *i*, more particularly in Fig. 1. The axis *j* of the wheel D passes through the slot *d* of the upright plate *c* of the frame B. This axis *j* may be secured at any desired height in plate *c* by means of a nut, *k*, on its front end, which nut fits on a screw-thread on the axis, and binds a shoulder, *l*, of the axis firmly in contact with plate *c* on the side opposite to the nut. In each stock *g* the auger or bit *m* is placed. The shanks of these augers extend to the back parts of the stocks *g*, and are secured there by pins or keys *n*, which pass transversely through the stocks *g* and fit in notches in the shanks of the augers or bits, as shown clearly in Fig. 3. E E are two plates, through the outer ends of which the stocks *g g* pass. The inner ends of these plates are fitted on the axis *j* of the spur-wheel D. F F are two parallel plates or bars secured to the bed-plate A, and serving as a support for the work or stuff to be bored, said plates being of such a height as to insure the work or stuff being properly presented to the augers or bits *m m*.

From the above description it will be seen that by turning the spur-wheel D from right to left the augers or bits *m m* will be rotated in a similar direction, and the work or stuff on being presented to or shoved toward the augers or bits *m m* will be bored, two holes being bored simultaneously, and it will also be seen that the holes may be bored at a greater or less distance apart by simply adjusting the bits nearer to or further from each other, the plates E forming a connection between the axis *j* and stocks *g g* of the stands C C to regulate the mesh of the gears.

The device may be constructed at a moderate cost, and by its use the dowel-holes may be expeditiously and accurately bored.

The manner of securing the augers or bits *m m* in the stocks *g* and the fitting of the same in the bearings *f* insure a correct centering of the augers in the bearing.

Having thus described the invention, we claim as new, and desire to secure by Letters Patent—

1. The means described for operating two or more bits simultaneously, consisting of holders *g*, pinions *h*, and internally-cogged wheel D, applied as described.

2. The means of regulating the distance apart of the bit-holders *g*, consisting of the arms E, adjustable in the slot *d* of a plate, B, as set forth.

3. The means for supporting the bit-holders in different positions, consisting of the stands C, adjustable in slots *b* of plate B, as described.

ANDREW P. MERCHANT.
ANDREW P. MERCHANT,
*Administrator.*
MARIA MERCHANT,
*Administratrix.*

Witnesses:
THOMAS DICKINSON,
HELEN M. MERCHANT.